(12) United States Patent
Lighty et al.

(10) Patent No.: US 11,486,270 B2
(45) Date of Patent: Nov. 1, 2022

(54) SPLINED OIL CATCHER

(71) Applicants: Rolls-Royce Corporation, Indianapolis, IN (US); Rolls-Royce North American Technologies Inc., Indianapolis, IN (US)

(72) Inventors: Kerry Lighty, Plainfield, IN (US); Brian Fish, Indianapolis, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 1070 days.

(21) Appl. No.: 16/146,563

(22) Filed: Sep. 28, 2018

(65) Prior Publication Data

US 2020/0102854 A1 Apr. 2, 2020

(51) Int. Cl.
*F01D 25/18* (2006.01)
*F16D 1/10* (2006.01)

(52) U.S. Cl.
CPC ............... *F01D 25/18* (2013.01); *F16D 1/10* (2013.01); *F16D 2001/103* (2013.01); *F16D 2300/0214* (2013.01); *F16D 2300/06* (2013.01)

(58) Field of Classification Search
CPC ...... F01D 25/18; F16D 1/10; F16D 2001/103; F16D 2300/0214; F16D 2300/06
USPC .......................................................... 184/6
See application file for complete search history.

(56) References Cited

U.S. PATENT DOCUMENTS

| | | |
|---|---|---|
| 3,589,471 A | 6/1971 | Edge |
| 3,915,521 A | 10/1975 | Young |
| 4,329,000 A | 5/1982 | Keske |
| 4,334,720 A | 6/1982 | Signer |
| 4,384,749 A | 5/1983 | Schaefer |
| 4,775,248 A | 10/1988 | Barbie et al. |
| 4,782,919 A | 11/1988 | Chalaire et al. |
| 4,947,639 A | 8/1990 | Hibner et al. |
| 4,952,076 A | 8/1990 | Wiley, III et al. |
| 4,981,415 A | 1/1991 | Marmol et al. |
| 4,983,051 A | 1/1991 | Hibner et al. |
| 5,106,209 A | 4/1992 | Atkinson et al. |
| 5,110,257 A | 5/1992 | Hibner et al. |

(Continued)

FOREIGN PATENT DOCUMENTS

| | | |
|---|---|---|
| DE | 952756 | 11/1956 |
| EP | 2657463 A1 | 10/2013 |

(Continued)

*Primary Examiner* — Gene O Crawford
*Assistant Examiner* — Emily Rose Kincaid
(74) *Attorney, Agent, or Firm* — Shumaker & Sieffert, P.A.

(57) ABSTRACT

A system is presented for directing the flow of cooling fluid in a rotational machine having co-axial rotatable shafts. The system comprises a first shaft rotatable about an axis, a second shaft rotatable about the axis and having a portion axially overlapping with the first shaft, and a fluid catcher. The fluid catcher is coupled between the first shaft and the second shaft. The fluid catcher comprises a first interface region interfacing with the first shaft, a second interface region interfacing with the second shaft, a fluid retention lip at least partly defining an oil capture region; and a body. The body is coupled to the oil retention lip and defines a channel in fluid communication with the oil capture region. The channel is positioned to direct fluid to one of the first interface region or the second interface region.

20 Claims, 5 Drawing Sheets

(56) References Cited

U.S. PATENT DOCUMENTS

| | | | |
|---|---|---|---|
| 5,183,342 | A | 2/1993 | Daiber et al. |
| 5,253,985 | A | 10/1993 | Ruetz |
| 6,682,222 | B2 | 1/2004 | Fisher |
| 6,976,827 | B2 | 12/2005 | Bruno et al. |
| 7,931,407 | B2 | 4/2011 | Begin et al. |
| 8,464,835 | B2 | 6/2013 | Munson |
| 8,834,095 | B2 | 9/2014 | Davis |
| 8,985,277 | B2 | 3/2015 | Hetherington et al. |
| 9,541,007 | B2 | 1/2017 | McCune et al. |
| 9,841,056 | B2 | 12/2017 | Snow et al. |
| 10,527,098 | B1 | 1/2020 | Lighty et al. |
| 2003/0039421 | A1 | 2/2003 | Fisher et al. |
| 2006/0193545 | A1 | 8/2006 | Bridges et al. |
| 2007/0165971 | A1 | 7/2007 | Alam et al. |
| 2013/0149141 | A1 | 6/2013 | Siniawski |
| 2013/0283758 | A1 | 10/2013 | Wotzak |
| 2015/0219152 | A1 | 8/2015 | Ward |
| 2017/0234222 | A1 | 8/2017 | Schwendenmann |
| 2018/0087404 | A1 | 3/2018 | Lighty |
| 2020/0102985 | A1 | 4/2020 | Lighty et al. |
| 2020/0102986 | A1 | 4/2020 | Lighty et al. |

FOREIGN PATENT DOCUMENTS

| | | |
|---|---|---|
| EP | 3284918 A1 | 2/2018 |
| EP | 3299585 A1 | 3/2018 |
| GB | 2218751 B | 11/1989 |
| JP | 2003139134 | 5/2003 |

SPLINED OIL CATCHER

CROSS-REFERENCE TO RELATED APPLICATIONS

This application is related to concurrently filed U.S. patent application Ser. No. 16/146,494, entitled "SYSTEMS AND METHODS OF OIL DISTRIBUTION FOR A BEARING,", filed Sep. 28, 2018, inventors: Kerry Lighty, Andrew Schwendenmann and Eric McClellan; U.S. patent application Ser. No. 16/146,660, entitled "OIL JET IN A CONFINED AXIAL SPACE,", filed Sep. 28, 2018, inventors: Kerry Lighty and David Farnum; and U.S. patent application Ser. No. 16/146,719, entitled "DRAIN ARRANGEMENT FOR A SQUEEZE FILM DAMPER,", filed Sep. 28, 2018, inventors: Kerry Lighty, David Farnum, Daniel Feinstein and Joseph Swift. The entirety of these applications are herein incorporated by reference.

BACKGROUND

In certain applications, multiple rotatable shafts in a rotating machine may need to be coupled together. Known methods of joining two shafts include, for example, a keyed joint and a splined joint. During operation, rotating machines typically generate high volumes of heat that must be removed to ensure continued safe, effective operation of the machine. Joined shafts may be a source of heat, particularly from friction during relative motion between the shafts. The joint between two shafts requires effective heat removal and lubrication.

SUMMARY

According to some aspects of the present disclosure, a system is disclosed for directing the flow of cooling fluid in a rotational machine having co-axial rotatable shafts. The system comprises a first rotatable shaft, a second rotatable shaft, and a fluid catcher. The first shaft is rotatable about an axis. The second shaft is rotatable about the axis and has a portion axially overlapping with the first shaft. The fluid catcher is coupled between the first shaft and the second shaft. The fluid catcher comprises a first interface region, a second interface region, a fluid retention lip, and a body. The first interface region interfaces with the first shaft. The second interface region interfaces with the second shaft. The fluid retention lip at least partly defines an oil capture region. The body is coupled to the oil retention lip and defines a channel in fluid communication with the oil capture region. The channel is positioned to direct fluid to one of the first interface region or the second interface region.

In some embodiments the first interface region interfaces with the first shaft as a splined joint. In some embodiments the first interface region defines a plurality of catcher splines spaced circumferentially about the fluid catcher. In some embodiments the first shaft defines a plurality of shaft splines adapted to interface with the catcher splines to transfer torque from one of the fluid catcher and first shaft to the other. In some embodiments the first shaft further defines a fluid reservoir adjacent the shaft splines and wherein the channel directs fluid to the fluid reservoir. In some embodiments the system further comprises a fluid dam positioned axially opposite the fluid reservoir from the shaft splines, the fluid dam having a radial dimension greater than a radial dimension of the shaft splines. In some embodiments the fluid dam defines at least one weep hole to allow weepage of fluid past the fluid dam.

In some embodiments the second interface region interfaces with the second shaft as a splined joint. In some embodiments the fluid catcher is disposed between a pair of axial stops of the second shaft to prevent axial motion of the fluid catcher relative to the second shaft. In some embodiments the body defines a plurality of channels, and wherein each channel comprises an axial portion and a radial portion. In some embodiments the fluid is oil.

According to further aspects of the present disclosure, an apparatus is disclosed for transferring torque between co-axial rotating shafts. The apparatus comprises an annular body, a first and second set of splines, and an oil retention lip. The body has an inner surface and an outer surface. The first set of splines extend radially outward from the outer surface. The second set of splines extend radially inward from the inner surface. The oil retention lip extends axially from the body and at least partly defines a capture region for capturing at least a portion of a stream of fluid. The body defines one or more fluid channels in fluid communication with the capture region. One or more of the fluid channels direct fluid onto the first set of splines.

In some embodiments one or more of the fluid channels direct fluid to a reservoir in fluid communication with the first set of splines. In some embodiments one or more of the fluid the oil channels comprise a first portion extending in a substantially axial direction and a second portion extending in a substantially radial direction.

In some embodiments the apparatus further comprises a dam positioned opposite the reservoir from the first set of splines, the dam having a radial dimension greater than a radial dimension of the first set of splines. In some embodiments the dam defines at least one weep hole to allow weepage of fluid past the dam.

According to further aspects of the present disclosure, a method is presented of cooling a splined torque transferring connection between co-axial rotating shafts. The method comprises coupling a spline adapter by a fixed spline to a working spline of the first shaft; coupling the spline adapter by a fixed spline to a working spline of the second shaft; defining a fluid catching region between an axially extending flange of the spline adapter and a radially outer surface of the second shaft; defining a channel in the spline adapter providing fluid communication between the fluid catching region and the fixed spline coupled to the working spline of the first shaft; and directing a fluid into the fluid catching region.

In some embodiments the method further comprises providing a fluid reservoir in fluid communication with the channel and the fixed spline coupled to the working spline of the first shaft. In some embodiments the method further comprises damming a flow of fluid across the fixed spline coupled to the working spline of the first shaft to ensure the flow of fluid reaches a desired radial dimension.

In some embodiments a fluid dam is provided for the step of damming the flow of fluid across the fixed spline coupled to the working spline of the first shaft. In some embodiments the method further comprises permitting weepage of fluid flow past the fluid dam. In some embodiments the method further comprises collecting fluid flow past the fluid dam in a fluid sump.

BRIEF DESCRIPTION OF THE DRAWINGS

The following will be apparent from elements of the figures, which are provided for illustrative purposes.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclose. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Joined shafts in a rotating machine may be, as but a few examples, the shaft of a turbine engine coupled to the shaft of an electrical generator, or the shaft of an electrical generator coupled to the shaft of a torquemeter. Such joined shafts may be subject to significant heating from friction between the shafts. Effective lubrication and heat removal is required at the joint between the shafts.

The present disclosure is directed to apparatus, systems, and methods of joining two rotatable shafts and supplying lubrication and heat removal to the joint between the shafts. More particularly, the present disclosure is directed to a splined oil catcher. The oil catcher is coupled between two shafts via a splined interface with each shaft. The oil catcher catches oil from a stream of oil and directs it to at least one of the splined interfaces to provide effective lubrication and heat removal. An oil dam may be included to ensure the splined interface is adequately flooded with oil during rotation of the shafts.

Figure 1:
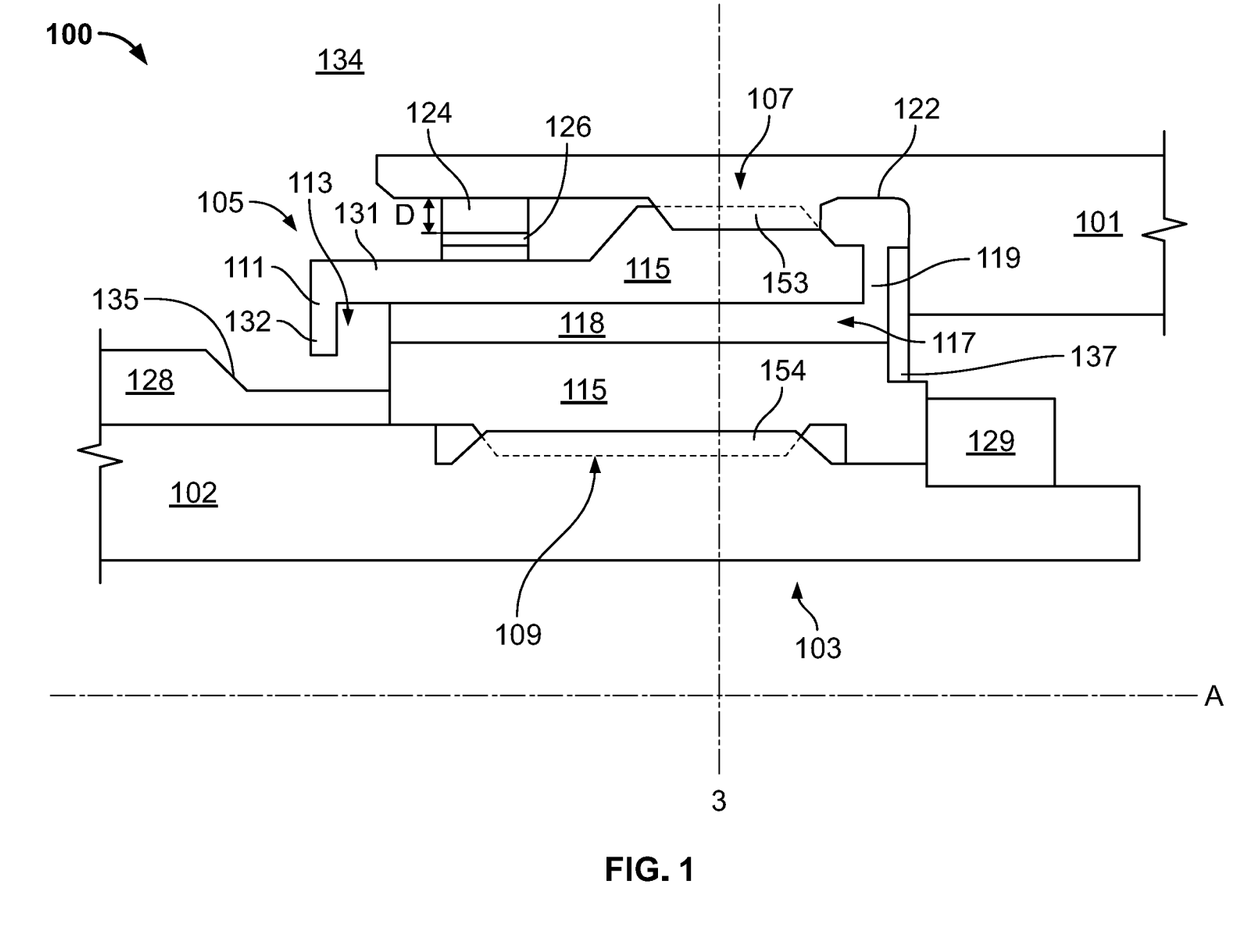
FIG. 1 is a cross-sectional schematic view of an oil catcher coupled between two rotatable shafts of a rotating machine, in accordance with some embodiments of the present disclosure.

FIG. 1 provides a cross-sectional schematic diagram of a system 100 of directing the flow of oil in a gas turbine engine. The system 100 comprises a first shaft 101, a second shaft 102, and an oil catcher 105. The first shaft 101, second shaft 102, and oil catcher are co-axial and rotatable about an axis of rotation A.

The first shaft 101 may be a high-, low-, or intermediate-speed shaft of a rotating machine. For example, the first shaft 101 may be a high, low, or intermediate spool of a gas turbine engine. In the illustrated embodiment of FIG. 1, the first shaft 101 is disposed radially outward and extends axially aft from the second shaft 102. First shaft 101 may be a torquemeter shaft.

Similarly, the second shaft 102 may be a high-, low-, or intermediate-speed shaft of a rotating machine. For example, the second shaft 102 may be a high, low, or intermediate spool of a gas turbine engine. In the illustrated embodiment of FIG. 1, the second shaft 102 is disposed radially inward and extends axially forward from the first shaft 101. The second shaft 102 comprises an overlapping portion 103 that axially overlaps with the first shaft 101. Second shaft 102 may be a generator shaft.

An oil catcher 105 may be coupled between the first shaft 101 and the second shaft 102. The oil catcher 105 comprises a body 115, a first interface region 107, a second interface region 109, and an oil retention lip 111. The oil catcher 105 may be formed from a single piece of machined material, and may be a unitary structure. The oil catcher 105 may be referred to as a fluid catcher and may be used to catch a fluid, for example oil. The oil catcher 105 may be referred to as a splined oil catcher or a spline adapter. The oil retention lip 111 may be referred to as a fluid retention lip.

The body 115 is an annular member that defines one or more channels 117. Each channel 117 may comprise an axial channel portion 118 and a radial channel portion 119 in fluid communication with each other. The body 115 may contact one or both of the first shaft 101 and the second shaft 102.

The body 115 may be positioned between axial stops to prevent axial motion of the body 115 relative to one of either the first shaft 101 or the second shaft 102. In the illustrated embodiment of FIG. 1, the body 115 is positioned between a forward axial stop 128 and aft axial stop 129 of the second shaft 102. The axial stops 128, 129 prevent axial motion of the body 115 relative to the second shaft 102. One or both of the axial stops 128, 129 may comprise a deflecting surface 135. In the embodiment illustrated at FIG. 1, the forward axial stop 128 comprises a deflecting surface 135 positioned to deflect a stream of oil toward the oil catcher 105.

The first interface region 107 couples the oil catcher 105 to the first shaft 101. The first interface region 107 may comprise a plurality of catcher outer splines 151 spaced about the circumference of the oil catcher 105. The catcher outer splines 151 of the first interface region 107 may be adapted to interface with one or more splines defined by the first shaft 101. Splines defined by the first shaft 101 may be referred to as first shaft splines 153.

The catcher outer splines 151 may extend only a portion of the axial length of the oil catcher 105. In the illustrated embodiment of FIG. 1, the catcher outer splines 151 of the first interface region 107 extend radially outward from the outer circumference of the body 115. The catcher outer splines 151 interface and/or mesh with first shaft splines 153. The first interface region 107 may interface with the first shaft 101 as a splined joint. The interfacing of the first interface region 107 with the first shaft 101 may transfer torque from one of the oil catcher 105 and first shaft 101 to the other.

The second interface region 109 couples the oil catcher 105 to the second shaft 102. The second interface region 109 may comprise a plurality of catcher inner splines 152 spaced about the circumference of the oil catcher 105. The catcher inner splines 152 of the second interface region 109 may be adapted to interface with one or more splines defined by the second shaft 102. Splines defined by the second shaft 102 may be referred to as second shaft splines 154.

The catcher inner splines 152 may extend only a portion of the axial length of the oil catcher 105. In the illustrated embodiment of FIG. 1, the catcher inner splines 152 of the second interface region 109 extend radially outward from the inner circumference of the body 115. The catcher inner splines 152 interface and/or mesh with second shaft splines 154 of the second shaft 102. The second interface region 109 may interface with the second shaft 102 as a splined joint. The interfacing of the second interface region 109 with the second shaft 102 may transfer torque from one of the oil catcher 105 and second shaft 102 to the other.

An oil retention lip 111 extends from the body 115 and at least partly defines an annular oil capture region 113 for capturing at least a portion of an oil stream from an oil jet. The oil retention lip 111 may comprise an annular axial member 131 extending from the body 115 and an annular radial member 132 coupled to the axial member 131. The radial member 132 may extend from the axial member 131 in a radially inward direction. The radial member 132 may at least partly define an opening or entrance to the oil capture region 113. The radial member 132 may be spaced from the second shaft 102 a sufficient distance to permit the ingress of oil into the oil capture region 113, and may have a radial dimension sufficient to prevent or reduce escape of oil from the oil capture region 113. The oil capture region 113 may be partly defined by the oil retention lip 111 and body 115. The oil capture region 113 may be defined between the oil retention lip 111 and a radially outer surface of the second shaft 102.

Channels 117 may be in fluid communication with the oil capture region 113. Channels 117 may extend from the oil capture region 113 to one of the first interface region 107 and second interface region 109, or a position proximate or adjacent the first interface region 107 and second interface region 109. Channels 117 may extend from the oil capture region 113 to an oil reservoir 122 positioned proximate or adjacent the first interface region 107 and second interface region 109. Channels 117 may direct oil from the oil capture region 113 to one of the first interface region 107 and the second interface region 109. In the illustrated embodiment of FIG. 1, a channel 117 extends from the oil capture region 113 to an oil reservoir 122 defined by the first shaft 101 and adjacent the first interface region 107. The oil reservoir 122 may be referred to as a fluid reservoir and may retain any fluid, for example oil.

The system 100 may further comprise an oil dam 124. The oil dam 124 may be positioned between the oil catcher 105 and the first shaft 101 or the second shaft 102. The oil dam 124 may be formed integrally with the body 115, and may extend radially outward from the body 115. The oil dam 124 may sealingly engage the first shaft 101 with a sealing member, such as an O-ring, disposed between the oil dam 124 and the first shaft 101. In other embodiments, the oil dam 124 may be coupled to either the first shaft 101 or the second shaft 102 without contacting the oil catcher 105.

The oil dam 124 may define one or more weep holes 126 to permit weeping of oil past the oil dam 124. Oil weeping past or overflowing the oil dam 124 flows into a sump 134. The oil dam 124 may be positioned axially opposite the oil reservoir 122 from the splines defined by the first shaft 101 or second shaft 102. The oil dam 124 may incorporate an O-ring.

The oil dam 124 may have a radial dimension greater than a radial dimension of the splines defined by the first shaft 101 or second shaft 102. The oil dam 124 may have a radial dimension D to the weep holes 126 greater than a radial dimension of the splines defined by the first shaft 101 or second shaft 102. These features may ensure that the splines remain covered with oil during rotation of the first shaft 101 and second shaft 102. In the illustrated embodiment of FIG. 1, the oil dam 124 has a radial dimension D between the first shaft 101 and the weep holes 126 that is greater than the radial dimension of the splines defined by the first shaft 101. In some embodiments the oil dam 124 defines a plurality of weep holes 126, for example at least eight weep holes 126, that may be spaced evenly about the circumference of the oil dam 124. In some embodiments the weep holes 126 are positioned radially below the root diameter of the spline to provide full oil flooding.

In some embodiments the oil catcher 105 may further comprise a back plate 137. The back plate 137 may be positioned to secure axial movement of oil through a channel 117, and may at least partly define the radial portion 119 of the channel 117. The back plate 137 may be mechanically restrained by the aft axial stop 129 or may be coupled to the body 115 by means such as welding, brazing, fasteners, or an interference fit. The back plate 137 is optionally included as its omission may not change the flow path of oil during rotation of the first shaft 101 and second shaft 102.

Figure 2:
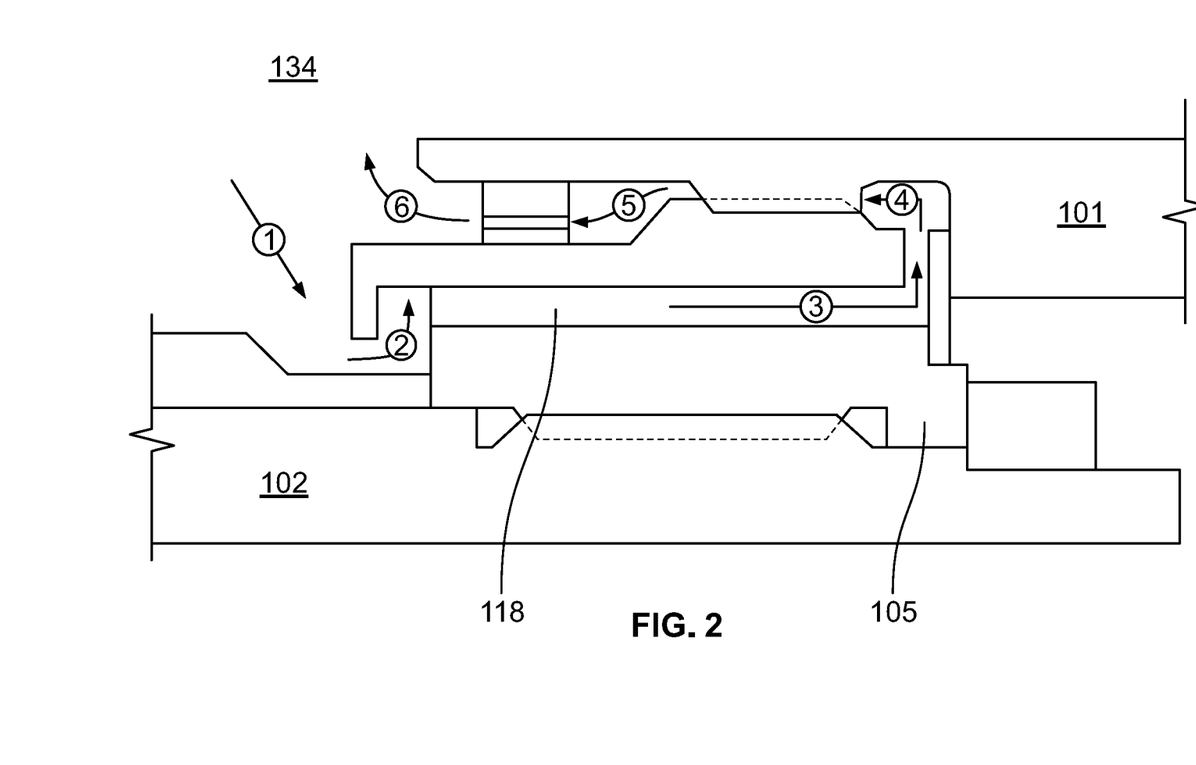
FIG. 2 is a cross-sectional schematic view showing the flow of oil through an oil catcher coupled between two rotatable shafts of a rotating machine, in accordance with some embodiments of the present disclosure.

The flow of oil through the system 100 is illustrated in FIG. 2. During operation, a stream of oil is ejected under pressure from a nozzle. The stream of oil is indicated by Arrow 1 of FIG. 2. The stream of oil is directed toward the second shaft 102, typically in a radially inward direction. The stream of oil may be directed toward a deflecting surface 135 positioned to deflect the oil generally in the direction of the oil catcher 105 and more specifically toward the oil capture region 113.

To aid in oil capture efficiency, the stream of oil may be angled such that the trajectory of the stream of oil is in the same direction as shaft rotation. Thus the stream of oil may be shot "over the horizon" of the shaft 102. Angling the stream of oil in such a manner reduces the angle of incidence with the oil catcher 105 and thus minimizes oil splash and deflection.

Oil is then captured in the oil capture region 113, as indicated by Arrow 2 of FIG. 2. Oil collected in the oil capture region 113 may pool and then move under hydraulic and centrifugal forces into one or more of the channels 117. The movement of oil through the channels 117 is indicated by Arrow 3. The oil may move in a primarily axial direction through an axial portion 118 of the channel 117 and then move in a primarily radial direction through a radial portion 119 of the channel 117.

Oil exiting a radial portion 119 of the channel 117 may be directed to an oil reservoir 122 defined by first shaft 101, as indicated by Arrow 4 of FIG. 2. The oil may pool in the reservoir 122 prior to proceeding under hydraulic and centrifugal forces to first interface region 107. At the first interface region 107, the oil lubricates the spline joint between the first shaft 101 and the oil catcher 105, and removes heat that may be generated in the spline joint to include heat generated by friction due to relative axial motion between the first shaft 101 and oil catcher 105. The spline joint of the first interface region 107 accommodates such axial motion while maintaining the first shaft 101 engaged with the oil catcher 105. By extension, the spline joint of the first interface region 107 accommodates such axial motion while maintaining the first shaft 101 engaged with the second shaft 102. The oil may flow through axial passages, gaps, or openings between the catcher splines 130 and shaft splines 140 of the first interface region 107.

Oil exits the first interface region 107 as indicated by Arrow 5, and may pool against oil dam 124. Once the oil has reached a sufficient radial depth (i.e. a radial depth of oil greater than the radial dimension D of the oil dam 124), the oil will overtop the oil dam 124 or weep through one or more weep holes 126 defined by the oil dam 124.

Oil exits the weep hole 126 of the oil dam 124 and enters a sump 134 as indicated by Arrow 6. The oil may be scavenged in the sump 134 and sent to a lubrication and scavenge system.

Figure 3:
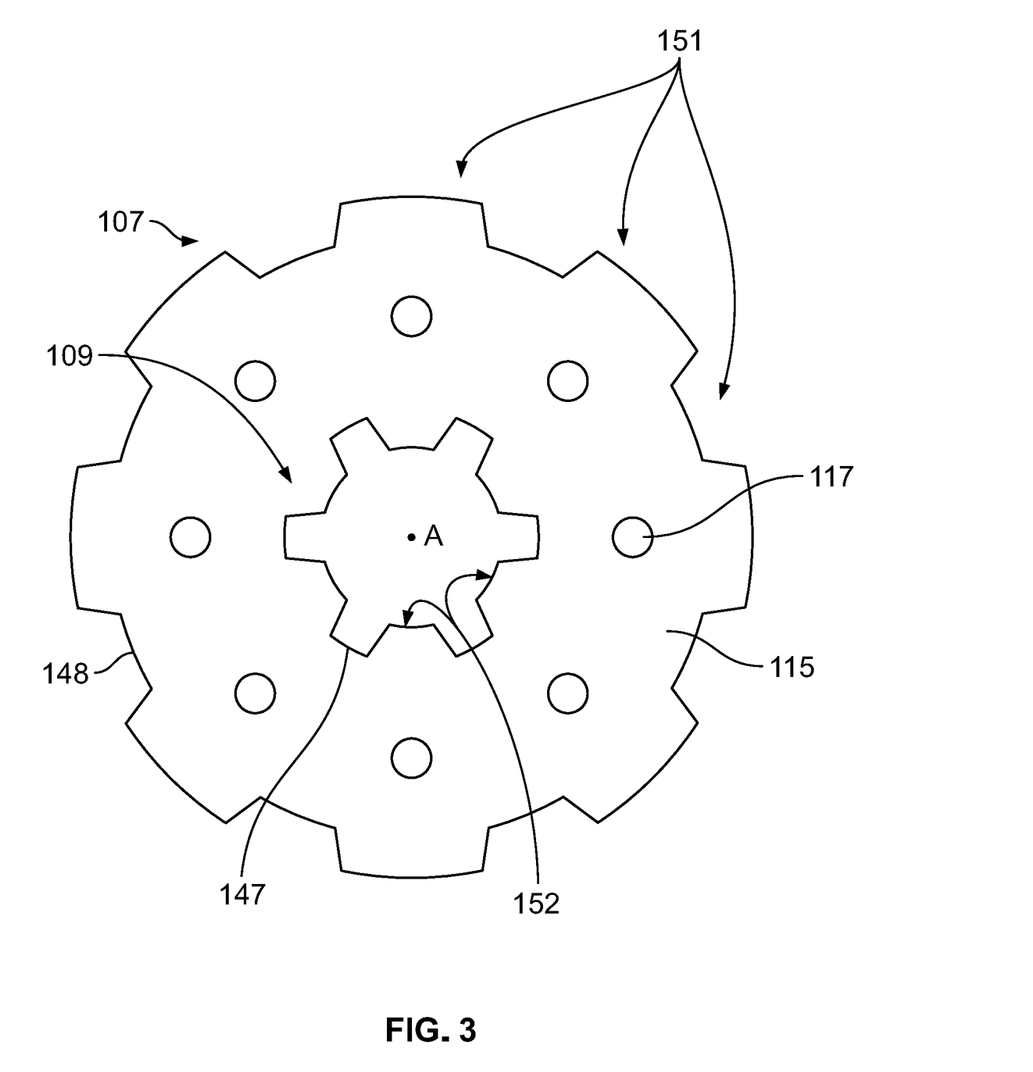
FIG. 3 is an axial, cross-sectional schematic view of an oil catcher in accordance with some embodiments of the present disclosure.

FIG. 3 provides an axial, cross-sectional schematic view of an oil catcher 105 in accordance with some embodiments of the present disclosure. As described above, the oil catcher 105 may comprise a plurality of catcher splines 130 positioned about an outer circumference as a first interface region 107 for interfacing with a first shaft 101. The catcher splines 130 of the first interface region 107 may extend radially outward from a radially outer surface 148 of the oil catcher 105.

The oil catcher 105 further may comprise a plurality of catcher splines 130 positioned about an inner circumference as a second interface region 109 for interfacing with a second shaft 102. The catcher splines 130 of the second interface region 109 may extend radially inward from a radially inner surface 147 of the oil catcher 105.

The body 115 of the oil catcher 105 defines a plurality of channels 117 that direct oil flow from an oil capture region 113 to one of the first interface region 107 and second interface region 109. In some embodiments the body 115 defines a plurality of channels 117, for example at least eight channels 117. In some embodiments each channel 117 comprises an axial portion 118 and a radial portion 119. The channels 117 may be spaced at even intervals about the circumference of the oil catcher 105. In some embodiments, the channels 117 may be spaced at uneven intervals.

The present disclosure further provides methods of transferring torque from a first shaft 101 to a co-axial second shaft 102. A flow diagram of one such method 400 is presented at FIG. 4. The method 400 begins at Block 401.

Figure 4:
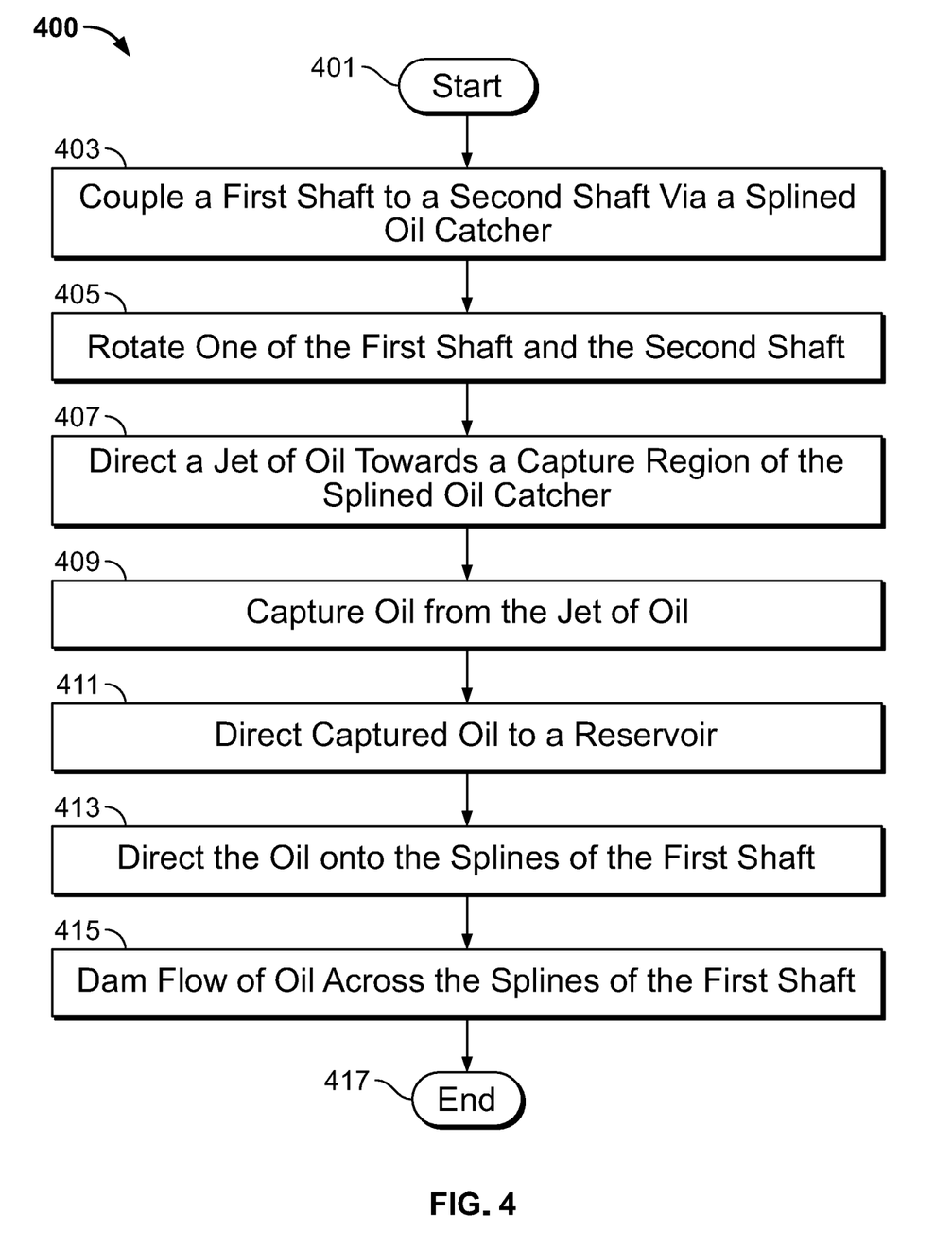
FIG. 4 is a flow diagram of a method in accordance with some embodiments of the present disclosure.

At Block 401 a first shaft 101 and a second shaft 102 may be coupled via an oil catcher 105. The oil catcher 105 may comprise a body 115, first interface region 107, second interface region 109, and oil retention lip 111. The oil retention lip 111 may at least partly define an oil capture region 113. The body 115 of the oil catcher 105 may define one or more channels 117 in fluid communication with the oil capture region 113 and one of the first interface region 107 and second interface region 109. The first interface region 107 and second interface region 109 may comprise a splined joint with the first shaft 101 and second shaft 102, respectively.

At Block 403, one of the first shaft 101 and second shaft 102 may be rotated. Torque is transferred from one shaft to the other view the oil catcher 105, causing rotation of both shafts 101, 102. During rotation, axial motion of the oil catcher 105 relative to the second shaft 102 may be prevented by one or more axial stops 128, 129. Axial motion of the oil catcher 105 relative to the first shaft 101 may be permitted via the spline joint of the first interface region 107.

Method 400 optionally includes one or more of the steps described with reference to Blocks 407 through 415 of FIG. 4. At Block 407 a stream of oil is directed toward the oil capture region 113 of the oil catcher 105. The stream of oil may be ejected under pressure from an oil nozzle disposed axially offset from the oil catcher 105. The stream of oil may be deflected by a deflecting surface 135 as it travels toward the oil catcher 105. The stream of oil may be angled such that the trajectory of the stream of oil is in the same direction as rotation of the second shaft 102.

At Block 409 oil from the stream of oil may be captured by the oil retention lip 111 and retained in the oil capture region 113. The oil may pool before entering one or more channels 117 defined by the body 115. At Block 411 the oil may be optionally directed to an oil reservoir 122. The oil reservoir 122 may be defined by the first shaft 101 and positioned proximate or adjacent the first interface region 107. The oil may be directed to the reservoir 122 by one or more of the channels 117. The channels 117 may comprise an axial portion 118 and a radial portion 119.

At Block 413 oil is directed onto one or more shaft splines 140 of the first shaft 101. The oil may also be directed onto one or more catcher splines 130 of the oil catcher 105. The catcher splines 130 may be engaged with the shaft splines 140.

At Block 415 the oil flow across and beyond the shaft splines 140 may be dammed. An oil dam 124 may be positioned axially opposite the oil reservoir 122 from the shaft splines 140. The oil dam 124 may have a radial dimension or a radial dimension to weep holes 126 that is greater than a radial dimension of one or more of the shaft splines 140. The oil dam 124 may ensure sufficient radial depth of oil over the shaft splines 140 to ensure sufficient lubrication and heat removal during rotation of the first shaft 101 and second shaft 102.

Method 400 may end at Block 417.

Figure 5:
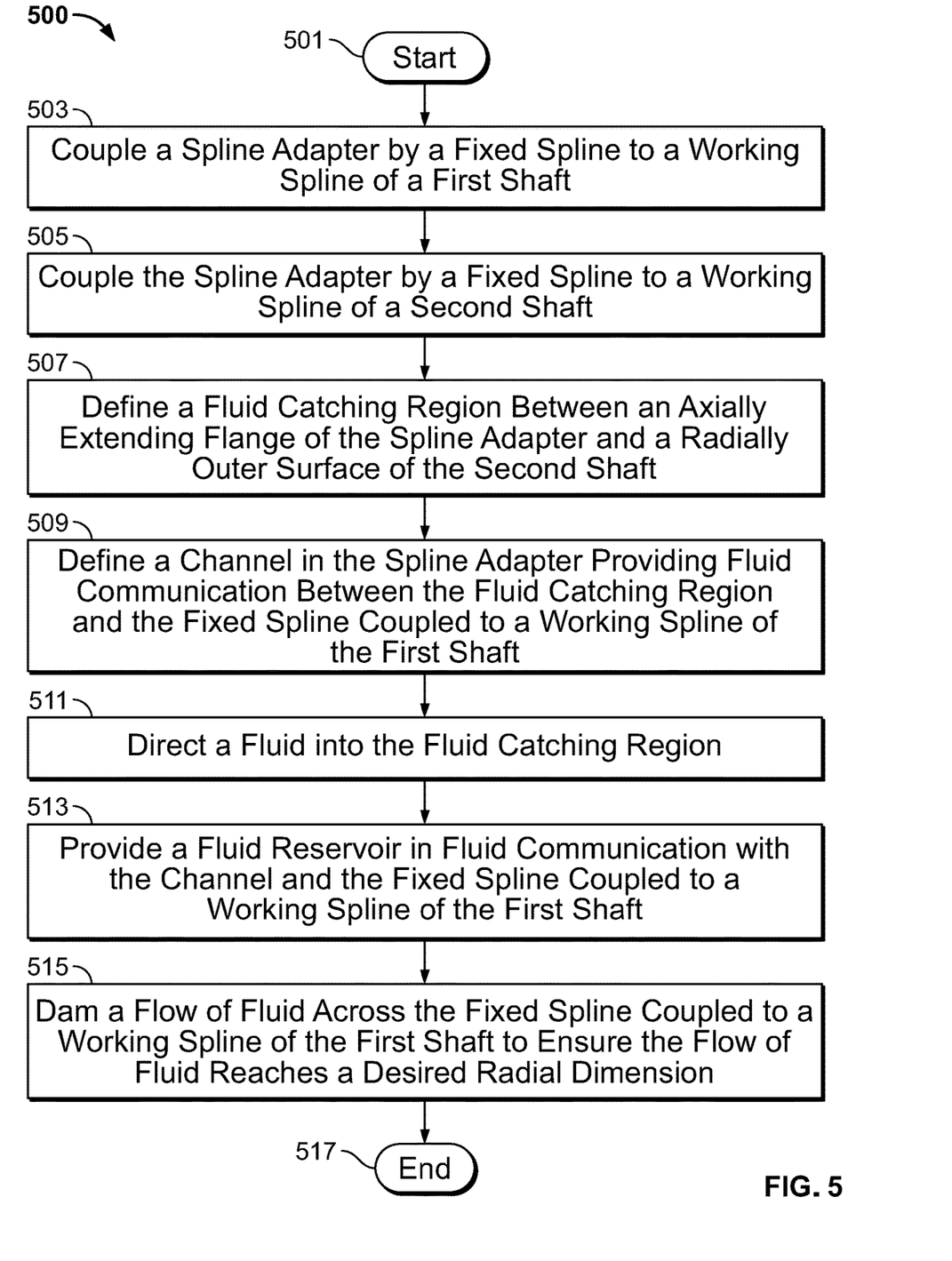
FIG. 5 is a flow diagram of a method in accordance with some embodiments of the present disclosure.

A flow diagram of another method 500 in accordance with some embodiments of the present disclosure is presented in FIG. 5. Method 500 starts at Block 501.

At Block 503 a spline adapter may be coupled by a fixed spline to a working spline of a first shaft. The spline adapter may be oil catcher 105 as described above. The first shaft may be first shaft 101. The fixed spline may be outer catcher splines 151. The working spline of the first shaft may be first shaft splines 153.

At Block 505 the spline adapter may be coupled by a fixed spline to a working splint of a second shaft. The second shaft may be second shaft 102. The fixed spline may be outer catcher splines 152. The working spline of the second shaft may be second shaft splines 154.

At Block 507 a fluid catching region may be defined. The fluid catching region, which may be the oil capture region 113 described above, may be defined between an axially extending flange of the spline adapter and a radially outer surface of the second shaft. At Block 509 a channel may be defined in the spline adapter to provide fluid communication between the fluid catching region and the fixed spline coupled to the working spline of the first shaft. The channel may be one or more channels. The channel may be channel 117 as described above.

At Block 511 fluid may be directed to the fluid catching region. The fluid may be oil, and may be ejected under pressure from an oil nozzle as an oil stream. The oil stream may be deflected by a deflecting surface toward the fluid catching region.

At Block 513 a reservoir may be provided in fluid communication with the channel and the fixed spline coupled to the working spline of the first shaft. The reservoir may be reservoir 122 defined by first shaft 101.

At Block 515 the fluid flow across the fixed spline coupled to the working spline of the first shaft may be dammed to ensure the flow of fluid reaches a desired radial dimension. The fluid flow may be dammed by an oil dam 124. The oil dam 124 may define one or more weep holes 126.

Method 500 ends at Block 517.

The present disclosure provides numerous advantages over the prior art. The disclosed splined oil catcher couples a pair of rotatable shafts while providing an oil flowpath for lubricating and cooling a spline joint. The use of an oil catcher allows for lubrication and cooling of the joined shafts via a stream of oil ejected under pressure from a nozzle, rather than from oil delivery via an inner shaft diameter.

The splined oil catcher permits axial motion between the shafts during rotation via a splined joint with one of the shafts. This allowance accounts for misalignment of the shafts, such as misalignment of a drive shaft to an engine and misalignment of a generator shaft to a generator. Heat caused by such movement between the shafts is transferred to the flow of oil across one or more of the spline joints. Additionally, the use of a fixed spline (i.e. no relative axial movement) at the inner circumference of the splined oil catcher ensures no frictional heat generation at the inner circumference and thus removes the need for lubrication and cooling at that location (i.e. at the second interface region).

Although examples are illustrated and described herein, embodiments are nevertheless not limited to the details shown, since various modifications and structural changes may be made therein by those of ordinary skill within the scope and range of equivalents of the claims.

What is claimed is:

1. A system for directing the flow of cooling fluid in a rotational machine having co-axial rotatable shafts, said system comprising:
    a first shaft rotatable about an axis;
    a second shaft rotatable about the axis and having a portion axially overlapping with the first shaft;
    a fluid catcher coupled between said first shaft and said second shaft, the fluid catcher comprising:
        a first interface region interfacing with said first shaft;
        a second interface region interfacing with said second shaft;
        a fluid retention lip at least partly defining an oil capture region; and
        a body, coupled to the oil retention lip and defining a channel in fluid communication with the oil capture region;
    wherein said channel is positioned to direct fluid to one of the first interface region or the second interface region.

2. The system of claim 1, wherein the first interface region interfaces with the first shaft as a splined joint.

3. The system of claim 2, wherein the first interface region defines a plurality of catcher splines spaced circumferentially about the fluid catcher, and wherein the first shaft defines a plurality of shaft splines adapted to interface with the catcher splines to transfer torque from one of the fluid catcher and first shaft to the other.

4. The system of claim 3 wherein the first shaft further defines a fluid reservoir adjacent the shaft splines and wherein said channel directs fluid to the fluid reservoir.

5. The system of claim 4 further comprising a fluid dam positioned axially opposite the fluid reservoir from the shaft splines, the fluid dam having a radial dimension greater than a radial dimension of the shaft splines.

6. The system of claim 5 wherein the fluid dam defines at least one weep hole to allow weepage of fluid past the fluid dam.

7. The system of claim 1, wherein the second interface region interfaces with the second shaft as a splined joint.

8. The system of claim 7 wherein the fluid catcher is disposed between a pair of axial stops of the second shaft to prevent axial motion of the fluid catcher relative to the second shaft.

9. The system of claim 1 wherein the body defines a plurality of channels, and wherein each channel comprises an axial portion and a radial portion.

10. The system of claim 1 wherein the fluid is oil.

11. An apparatus for transferring torque between co-axial rotating shafts, said apparatus comprising:
    an annular body having an inner surface and an outer surface;
    a first set of splines extending radially outward from said outer surface;
    a second set of splines extending radially inward from said inner surface; and
    an oil retention lip extending axially from said body and at least partly defining a capture region for capturing at least a portion of a stream of fluid;
    wherein said body defines one or more fluid channels in fluid communication with the capture region, one or more of the fluid channels direct fluid onto said first set of splines.

12. The apparatus of claim 11 wherein one or more of said fluid channels directs fluid to a reservoir in fluid communication with said first set of splines.

13. The apparatus of claim 11 wherein one or more of said fluid the oil channels comprise a first portion extending in a substantially axial direction and a second portion extending in a substantially radial direction.

14. The apparatus of claim 12 further comprising a dam positioned opposite the reservoir from said first set of splines, the dam having a radial dimension greater than a radial dimension of said first set of splines.

15. The apparatus of claim 14 wherein the dam defines at least one weep hole to allow weepage of fluid past the dam.

16. A method of cooling a splined torque transferring connection between co-axial rotating shafts, said method comprising:
    coupling a spline adapter by a fixed spline to a working spline of the first shaft;
    coupling the spline adapter by a fixed spline to a working spline of the second shaft;
    defining a fluid catching region between an axially extending flange of the spline adapter and a radially outer surface of the second shaft;
    defining a channel in the spline adapter providing fluid communication between the fluid catching region and the fixed spline coupled to the working spline of the first shaft; and
    directing a fluid into the fluid catching region.

17. The method of claim 16 further comprising:
    providing a fluid reservoir in fluid communication with the channel and the fixed spline coupled to the working spline of the first shaft.

18. The method of claim 17 further comprising:
    damming a flow of fluid across the fixed spline coupled to the working spline of the first shaft to ensure the flow of fluid reaches a desired radial dimension.

19. The method of claim 18 wherein a fluid dam is provided for the step of damming the flow of fluid across the fixed spline coupled to the working spline of the first shaft, and wherein the method further comprises:
    permitting weepage of fluid flow past the fluid dam.

20. The method of claim 19 further comprising:
    collecting fluid flow past the fluid dam in a fluid sump.

* * * * *